(12) United States Patent
Pakarinen et al.

(10) Patent No.: US 7,317,912 B2
(45) Date of Patent: Jan. 8, 2008

(54) SOFTWARE DEVELOPMENT ENVIRONMENT

(75) Inventors: Kari Pakarinen, Pirkkala (FI); Juha Torkkeli, Tampere (FI)

(73) Assignee: Nokia Corporation, Espoo (FI)

( * ) Notice: Subject to any disclaimer, the term of this patent is extended or adjusted under 35 U.S.C. 154(b) by 646 days.

(21) Appl. No.: 10/779,127

(22) Filed: Feb. 16, 2004

(65) Prior Publication Data

US 2004/0192277 A1 Sep. 30, 2004

(30) Foreign Application Priority Data

Feb. 17, 2003 (FI) ................... 20030240

(51) Int. Cl.
*H04M 3/00* (2006.01)

(52) U.S. Cl. ...................... 455/418; 455/557

(58) Field of Classification Search ................ 455/418, 455/557, 419, 420

See application file for complete search history.

(56) References Cited

U.S. PATENT DOCUMENTS

| 5,619,685 A | 4/1997 | Schiavone |
| 6,041,365 A | 3/2000 | Kleinerman |
| 2002/0169591 A1 | 11/2002 | Ryzl |
| 2003/0018694 A1 | 1/2003 | Chen et al. |

FOREIGN PATENT DOCUMENTS

EP 0 822 491 A2 4/1998

OTHER PUBLICATIONS

Nokia Product Data Sheet, "Nokia Mobile Internet Toolkit 3.1", Jul. 2002.
Nokia Corporation, "Designing Applications for Smartphones—Series 60 Platform Overview", Apr. 3, 2002.

*Primary Examiner*—Temica Beamer
(74) *Attorney, Agent, or Firm*—Hollingsworth & Funk, LLC

(57) ABSTRACT

The invention relates to arranging data transfer in a data system between software components implementing mobile communication applications in a software development environment. The data system comprises adapters for the different software components and for transferring data of a broker component between different adapters, wherein the adapter provides an interface to the broker component for at least one software component connected thereto. Addressing information is maintained in the broker component about the adapters in the data system. A first adapter in the data system is activated for a first software component and a second adapter for a second software component in response to a need for data transfer between the first software component and the second software component. Data is transferred in the broker component between the first adapter and the second adapter in accordance with the addressing information.

10 Claims, 3 Drawing Sheets

SOFTWARE DEVELOPMENT ENVIRONMENT

FIELD OF THE INVENTION

The invention relates to software development environments and particularly to software development environments for software related to mobile communication.

BACKGROUND OF THE INVENTION

As FIG. 1 illustrates, a mobile communication environment includes several different parties between which data is transferred. Terminals TE represent users of services. Services are provided by service providers SP and a network MNW, for instance a mobile network. The environment may also include content providers CP, the content provided by which is supplied to the terminals TE by the service providers SP or the network MNW. For example, for obtaining news, a short message is transmitted from the terminal TE to the mobile network MNW, which forwards it to a weather service provider SP. The service provider SP creates a multimedia message based on weather data obtained from a content provider CP providing weather forecasts. The multmedia message is forwarded to the mobile network MNW, which forwards it to the terminal TE. If no connection can be made to the mobile station TE, the mobile network can store the multimedia message in a message centre and transmit it immediately when the TE again connects to the network. The function of software components developed needs to be tested when new services are developed for the terminals TE, when new terminals TE or network elements are developed, and when new functions are developed for the terminals TE or the network elements.

Software components can be tested at the development stage in a software development environment, whereby no actual equipment is needed, but the testing can be performed fully by software by means of one computer, for example. Terminal emulators have been developed, which totally or partly model the operation of a terminal. The advantage of application development environments of this kind is that the applications do not have to be loaded in actual devices for testing the functioning of an application. An application development environment utilizing emulators is illustrated in U.S. published patent application no. 20020169591. A terminal emulator can be loaded in a software development environment and it can be used to test the operation of an application, e.g. for testing what a message transmitted by a service looks like in a terminal. Typically, special software development environments are tailored for different technologies, and it has been impossible to connect the environments to each other. For example, there are special software development environments for different communication applications, and special software development environments for Internet browser applications. Even though several different terminal emulators could be loaded in a software developent environment, the software component being developed has to be tested also in separate test processes for each terminal emulator. An example of this is that the application developer has to load an emulator separately for each telephone model and transmit the multimedia message created by the application separately to each of these emulators.

BRIEF DESCRIPTION OF THE INVENTION

The object of the invention is thus to improve the connectivity of software components. The object of the invention is achieved by a method, data system, data processing device, software product, data storage medium and signal, which are characterized by what is stated in the independent claims. The preferred embodiments of the invention are described in the dependent claims.

The invention is based on the data system comprising adapters for the different software components and a broker component for transferring data between different adapters, wherein the adapter provides an interface to the broker component for at least one software component connected to the adapter, and wherein addressing information is maintained in the broker component about the adapters in the data system. In the data system, a first adapter in the data system is activated for a first software component and a second adapter for a second software component in response to a need for data transfer between the first software component and the second software component. Data is transferred in the broker component between the first adapter and the second adapter in accordance with the addressing information. An adapter generally refers to a functionality enabling data transfer between a software component and a broker component.

An advantage of the arrangement of the invention is that a general communication platform is provided, to which software components supporting very many different kinds of technologies can be connected and between which data transfer can be arranged. The adapters allow the data transfer functionality provided by the broker component to be hidden from the software components, and, on the other hand, software components supporting different technologies to be connected to the broker component. Only one adapter is required for each software component. This allows for instance a content provider to test its content in various terminal emulators by using only one interface to the broker component. The invention enables easier and faster testing of the operation of mobile communication applications, since all data transfer to the required software components can be arranged in the same software development environment via the broker component and the adapters.

In accordance with a preferred embodiment of the invention, the adapter provides an interface to a data transfer application of a mobile system, the application enabling the transfer a message received from the broker component and the adapter further to a second mobile station or mobile network. This embodiment provides the advantage that for instance testing can be arranged by using an actual device or data transfer can be arranged for instance to an actual element in a mobile network from the software development environment. Several software components can be tested simultaneously, and they can reside both in actual terminals and in terminal emulators.

BRIEF DESCRIPTION OF THE FIGURES

In the following, preferred embodiments of the invention will be described in detail with reference to Appendix 1 and the accompanying drawings, in which FIG. 1 generally shows different parties in a mobile communication environment.

DETAILED DESCRIPTION OF THE INVENTION

Figure 1:
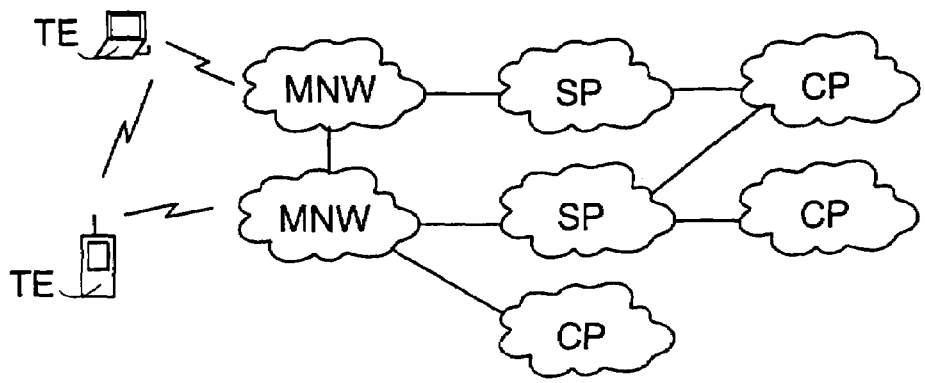
Figure 2:
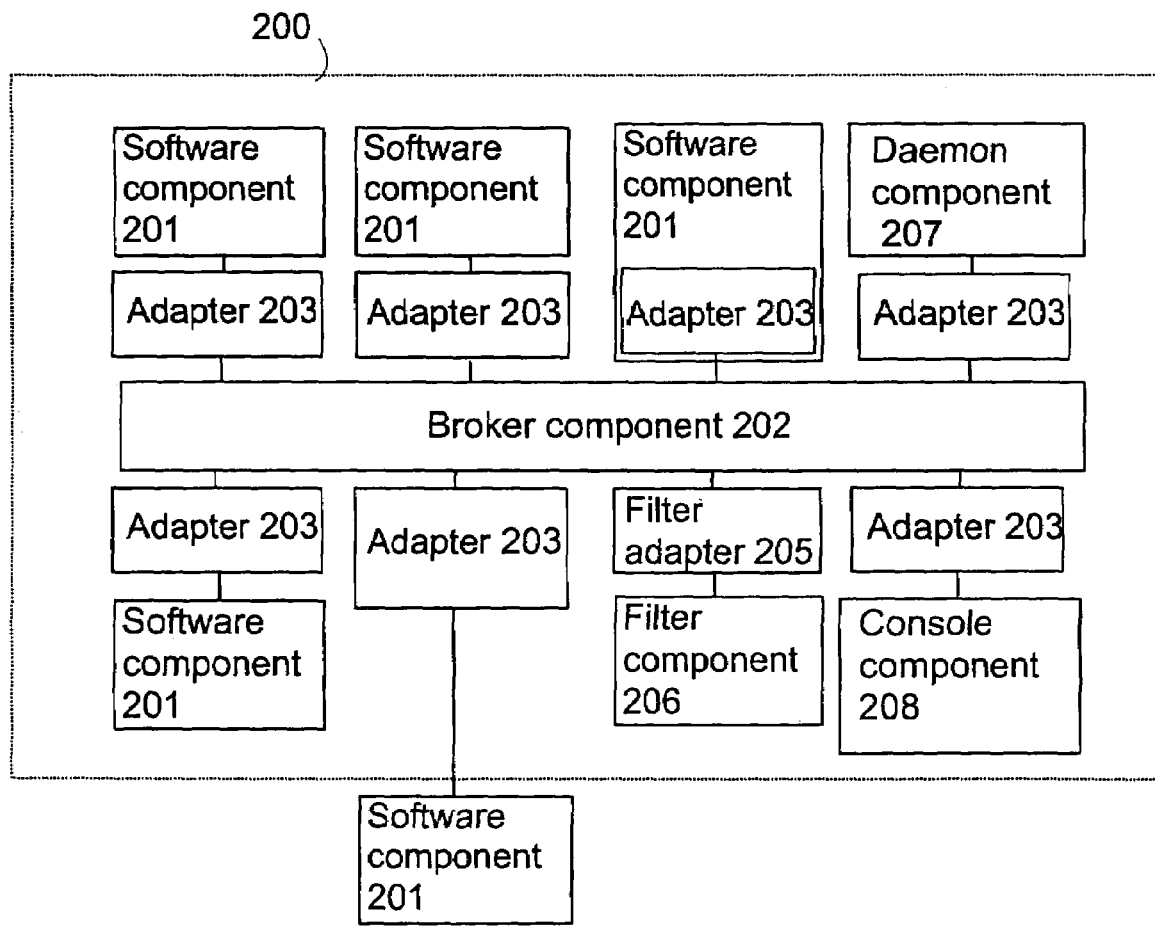
FIG. 2 shows a software development environment of a preferred embodiment of the invention.

FIG. 2 illustrates a data system 200 according to a preferred embodiment of the invention. The data system 200 may operate as a software development environment, enabling at least the testing of different software components 201. A software component 201 may be for instance a mobile communication application software development tool, terminal, system or service emulator, content development tool, testing tool, or an application program of an external system or device. The data system 200 comprises several adapters 203 providing an interface for at least one software component 201 connected thereto. Particularly, the adapter 203 connects (an external) software component 201 to a broker component 202, which acts as a data transfer gateway between the adapters. The broker component 202 attends to all data transfer between the adapters 203 and, consequently, between the software components 201. The broker component 202 is a communication centre of the data system 200 and attends to all data transfer between the adapters 203. The adapters 203 and the broker component 202 constitute a broker functionality for external software components 201.

The data system 200 also comprises a daemon component 207, a console component 208, and preferably a filter component 206 and a filter adapter 205 associated therewith. The daemon component 207 manages the software components 201, 206 executable in a local workstation, the broker component 202, the filters 203, 205, the console components 208, and maintains a local log file. The console component 208 is a graphical user interface tool (GUI Tool), by means of which a user is able to obtain information about the system 200 and manage its functions, such as the adapters 203, 205 and the data transfer via the broker component 202. The filter adapter 205 enables monitoring, analyzing and possibly modifying the data transferred in the broker component 202. The broker component 202 may transfer traffic between given adapters 203 via the filter adapter 205 for analysis in the filter component 206. The data system 200 can be executed in one data processing device or in several data processing devices connected to each other for instance via a TCP/IP network. It is to be noted that the system shown in FIG. 2 is only one manner of implementing the invention, e.g. the functions of the console component 208 and the daemon component 207 can be implemented in one component.

Figure 3:
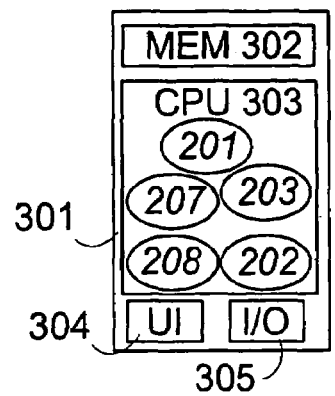
FIG. 3 illustrates a data processing device.

FIG. 3 illustrates a data processing device 301, wherein at least part of the data system 200 is implemented. The data processing device 301 comprises memory 302, a user interface 304, I/O means 305 for arranging external data transfer, and a central processing unit 303 CPU comprising one or more processors. The memory 302 comprises a non-volatile portion for storing applications controlling the central processing unit 303 and other data to be stored, and a volatile portion for use for temporary data processing. Computer program codes executed in the central processing unit 303 can cause the data processing device 301 to implement functions illustrated in FIG. 2 and later in FIGS. 3, 4, 5 and 6, such as one or more software components 201, adapters 203, 205, the daemon component 207, the console component 208 and the broker component 202. Computer program code may be stored in any one or more memory means, e.g. a hard disk in a PC, a memory card, or a CD ROM, from where they can be loaded in the memory 302 of the device 301 executing them. Computer program code may also be loaded via a network using the TCP/IP protocol stack (Transport Control Protocol/Internet Protocol), for example. The inventive means can also be implemented at least partly by utilizing hardware solutions.

It is to be noted that the functions illustrated in FIG. 2 can be executed in several data processing devices 301 communicating with each other. In this case, the data system 200 can be distributed, and development and testing of mobile applications, for instance, can be carried out in several separate devices 301. In this case, the broker component 202 can be implemented by entities in different devices; the entities communicating using any data transfer protocol, e.g. the TCP/IP protocol stack. In a distributed data system, remote use can be arranged, whereby software components 201 of the second data processing device can be activated from the software component 201, 207, 208 of the first data processing device. The data processing device 301 may be any device capable of executing several possibly even large software components. In accordance with a preferred embodiment, the system 200 utilizes Java-based functions, the Java™ Runtime Environment being executed in the device 301. In the following, reference is made to this embodiment; it should, however, be noted that the invention can be implemented also using other programming techniques.

Figure 4:
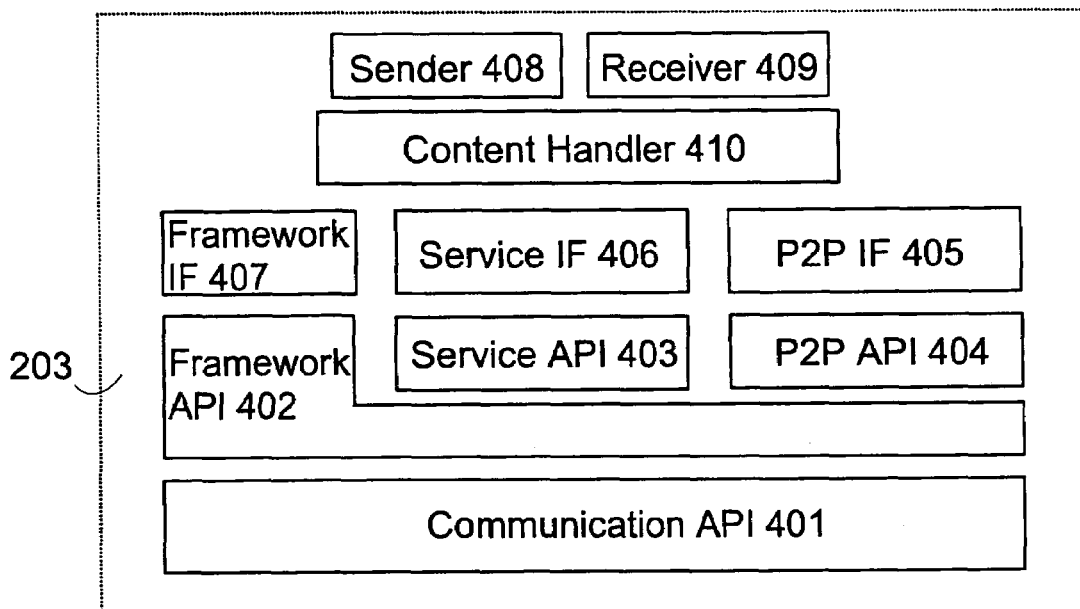
FIG. 4 illustrates layers in an adapter of a preferred embodiment of the invention.

FIG. 4 illustrates layers of an adapter 203, 205 according to a preferred embodiment. The adapter 203, 205 is a component that connects (external) software components 201, 206 to the broker component 202. The adapter 203, 205 is composed of an application program interface to software components 201, an adaptation code for data transfer between the software component 201 and the application program interface, and a part executing the adaptation code. The adapter 203, 205 publishes interfaces for specifying an adaptation code between the different software components 201 and the broker component 202, publishes system interfaces for connecting the daemon component 207 and the console component 208 to the broker component 202, and maintains a connection to the broker component 202. The adapter 203, 205 hides the functionality of the broker component 202 from the software component 201, 207 and 208. The adapters 203, 205 can be implemented by using reusable components to enable adaptation to different adaptation types. In this case, adapters generated for different platforms, for example, can utilize the same components.

The adapter 203 comprises an adaptation layer composed of a framework interface (Framework IF) 407, a service interface (Service IF) 406 and a point-to-point interface (P2P IF) 405. Under the adaptation layer is an implementation layer including a framework application program interface (Framework API) 402, a service application program interface (Service API) 403, and a point-to-point application program interface (Point to Point API) 404. Under the implementation layer is a transport layer including a communication application program interface (Communication API) 401. The adaptation layer 405, 406, 407 is a basic adaptation interface for connecting external software to the broker component 202; it connects the implementation layer 402, 403, 404 to the technology concerned. The adaptation layer is the only layer that has to be modified when an adapter 203 is developed for a new technology. The framework interface 407 is the main interface for connecting the adapter 203 to the broker component 202, and it includes general adapter-related functions, such as point-to-point registering. The service interface 406 attends to the synchronous and asynchronous transfer and reception of event-based, i.e. events. The point-to-point interface 405 includes functions associated with the management of point-to-point connections, i.e. P2P connections. It informs the adapter 203 when another adapter 203 wants to open a connection, it enables the opening and closing of incoming and outgoing flows to an adapter 203 connected to the broker component 202. Similarly, the adaptation layer blocks 405, 406 and 407 use the application program interfaces 404, 403, 402 of the implementation layer. In accordance with a preferred embodiment, the adaptation layer 405, 406, 407 is a platform-independent Java implementation. The transport layer, i.e. the communication application program interface 401 connects the adapter 203 to the broker component 202. It attends to connections, connection errors and automatic connection reestablishments. In accordance with a preferred embodiment, data transfer between the adapter 203 and the broker component 202 is RMI-based (Remote Method Invocation), the transport layer hiding the RMI functionality from the other blocks.

There are two different ways to implement the adaptation between the software component 201, 206 and the broker component 202: by software adaptation or communication adaptation. In software adaptation, the software components 201 are integrated directly to the adaptation interfaces by software 401 to 407 using API calls (application program interface calls). Consequently, the adaptation logics of the adapter 203 and the functions illustrated in FIG. 4 can be executed in a software component 201 process. This embodiment provides the advantage that the software component 201 can also be managed from the data system 200 (from the daemon component 207).

In the communication adaptation, the software component 201 communicates with the adapter 203 using some data transfer protocol. The adapter 203 and the software component 201 are separate processes completely separate from each other. The transport protocol may be any protocol supported by the underlying operating system and programming language, e.g. a TCP/IP-based protocol or file transfer. For the communication adaptation, various general data transfer components can be specified in the adapters 203, such as a sender component 408 and a receiver component 409, which attend to data transfer between the software component 201 and the adapter 203 based on their address data. Examples are a receiver component for receiving data from a specified TCP/IP port and a sender component 408 for writing in a specified directory and file. In addition to data transfer components; the communication adaptation also uses a content handler component 410, which correctly interprets the specified content and attends to content transmission, e.g. transfer of HTTP commands. The communication adaptation enables the implementation of the adapter 203 by utilizing existing components for the software components 201 so that the code of the software components does not have to be modified.

For different software components 201 that can be called products, configured adapters 203 are specified based on templates. A template represents an installed (external) software component 201 and includes information about its properties required for arranging data transfer. For integrating the software component 201, the template includes a general specification that can be used for configuring the adapter 203 exactly for the software component 201 concerned. The template particularly specifies elements for identifying the adapter and for specifying its properties, such as service type identifier. The template preferably also includes an element for specifying a host address, which can be used for instance for activating an adapter in a different device. The template may also include elements associated with the management of the adapter, and elements associated with the communication adaptation, e.g. elements for transmitter and receiver class names. Each configured adapter 203 is identified based on an identifier stored in the adapter configuration. This identifier is a character string, e.g. a telephone number. The configured adapter is connected to the broker component 202, after which data can be transferred via it. The template can also be used in the console component 208 to represent the software components 201 installed in the system for the user. In accordance with a preferred embodiment, the template includes one or more XML files including information and a JAR file including adapter-specific Java classes and resources. Separate templates are created for different software components, e.g. each mobile station emulator has a special mobile station model-specific template. Appendix 1 illustrates a DTD definition (Document Type Definition) for the template, i.e. it illustrates elements that may be included in a template according to an embodiment and in the configuration defined thereof. In accordance with a preferred embodiment, the same template can be used to configure several adapters 203 in the data system 200, enabling for instance the arrangement of several identical parallel mobile station emulators in the system 200.

The creation of a template is easy once the properties of the software component 201 are known. An adaptation mechanism is specified first, i.e. whether a software adaptation or a communication adaptation is concerned. Based on this, a template is created, i.e. the elements to be used are specified and they are given default values. In a communication adaptation different elements are required than in a software adaptation, particularly the settings of the components 408, 409 and 410 enabling the arrangement of data transfer are required in addition. In the software adaptation, the template is integrated into the software component 201. The template created is used to create installation files for installing the template in the data system 200. The elements illustrated in Appendix 1, for example, can be used, for which default values are specified.

Figure 5:
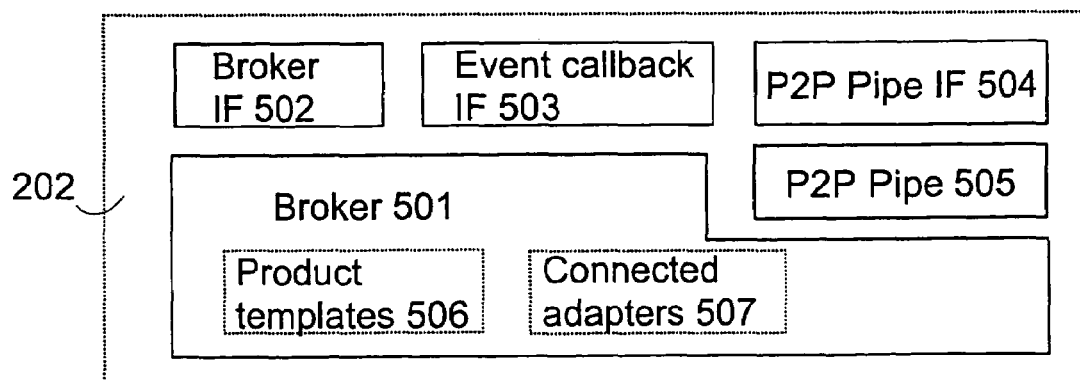
FIG. 5 illustrates layers in a broker component of a preferred embodiment of the invention.

FIG. 5 illustrates layers of a broker component 202 according to a preferred embodiment. The broker component 202 operates as a communication platform in the software development system 200. It carries out the following functions:

maintains a list 506 of installed templates, manages a list 507 of adapters 203, 205 connected thereto and their properties, manages the addressing information of the adapters 203, 205, manages event-based and stream-based data transfer between the adapters 203, 205, provides a command interface for the adapters 203, 205 for implementing commands e.g. for disconnecting the adapter 203, 205 or for obtaining a list of connected adapters, and informs the adapters 203, 205 of changes in available templates, configurations and adapter states.

The broker component 202 includes an interface layer including the interfaces and a broker interface (Broker IF) 502, an event callback interface 503, and a point-to-point pipe interface (P2P Pipe IF) 504. The interface 502 includes general functions associated with the broker component 202, e.g. a transmission function. The interface 503 includes event-based data transfer functions for arranging event-based data transfer with the adapters 203, 305. The interface 504 includes functions for processing incoming and outgoing streams. In accordance with a preferred embodiment, the implantation layer of the broker component 202 includes broker implementation classes; a broker 501 and a point-to-point pipe functionality (P2P Pipe) 505. The configuration of the broker component 202 is preferably stored in an XML file. The configuration includes general settings of the broker component 202, such as broadcast numbers and RMI ports.

Typically, the broker component 202 routes messages directly from one adapter 203 to another. Messages may also be transferred via the filter adapter 205 and the filter component 206. This allows the filter component 206 to intervene in the messages and e.g. simulate data transfer errors to the messages to be transferred. The transmitting and receiving adapters 203 do not detect the intervening filter adapter 205. Static routing may also be used in the broker component 202. In this case, the broker component 202 sets, e.g. for a testing situation, an entry in a routing table, in accordance with which the messages from the first adapter 203 are automatically forwarded to the specified second adapter 203, whereby the packets to be transferred do not even require a destination address.

The identifiers specified for the adapters 203, 205 can be used as communication addresses in the broker component 202. When a P2P connection is being activated, this allows the first adapter 203, 205 to indicate the identifier of the second adapter 203, 205, with which communication is to take place. In the broker component 202, the destination adapter can also be specified from the data entity to be transferred. For example, the adapter 203 specifies the destination telephone number from the destination number field of the short message to be transmitted. This destination telephone number is set for the broker component 202 as the destination address for the data packet including the short message to be transmitted, and, on the basis of this, the broker component 202 transfers the data packet to the adapter 203, 205 whose specified identifier (in list 507) is said telephone number. As was mentioned, in accordance with an embodiment, data transfer between the adapters 203, 205 and the broker component 202 is implemented using general RMI functions, whereby the adapters 203, 205 have special RMI interfaces (logical ports) to the broker component 202.

The system 200 may also comprise broadcast or multicast addresses. If the message is transmitted to a broadcast address, the broker component 202 transmits copies of the message to all operating adapters 203. In accordance with a preferred embodiment, the broker component 202 also maintains, in the list 507, information about the properties of the connected adapters 203 (i.e. the properties of the software components 201 represented by them) and checks the properties of the software component 201 when an event is being transmitted or a connection being set up to it. This allows the broker component to arrange data transfer only between adapters 203 and correspondingly software components 201 capable of data transfer with each other. For example, when desired, a message can be transmitted in the system to all software components 201 supporting the MMS technology (Multimedia Messaging Service). For this kind of a group transmission, e.g. a special service type-specific address can be used, on the basis of which the broker component 202 knows that a group transmission directed to software components of a given service type is concerned. In this case, the broker component 202 checks, on the basis of the list 507 of connected adapters, the service type of which adapters 203 in the adapter configuration is defined to be MMS. The broker component 202 then transmits the message to all adapters 203 supporting the MMS service.

It is to be noted that the functions of the adapter 202 and the broker component 203 illustrated in FIGS. 4 and 5 are one way to implement them in the data system 200. Not all functions shown in FIGS. 4 and 5 are necessary and, on the other hand, new functions can be added to the adapter 202 and/or the broker component 203.

In the following, the connection of a new software component 201 to a data system in a software development environment e.g. for testing it is illustrated with reference to FIG. 6. When the new software component 201 is to be connected to the system 200, a configured adapter 203 is created for it on the basis of a template. In the system 200, an installation program can be activated via the console component 208 for installing the new software component 201 and a template 601 created for it, in the system 200. The daemon 207 detects the new template and notifies it to the broker component 202. The broker component 202 broadcasts information about the new template to the console components 208, if required.

An input 602 received from a user via the console component 208 can be used to create a configured adapter 203 from the template by appending 603 the user's settings to a copy taken of the template, at least by setting an identifier for the adapter 203. Any settings given by the user replace the default settings obtained from the template. The configured adapter 203 gives the identifier to the software component 201 in the system 200; it may include various specified parameters associated with the software component 201, such as file names and directory paths. The broker component 202 stores 604 the configuration for later use. In accordance with a preferred embodiment, the configuration is stored as an XML file (from an XML-form template). An adapter 202 is now specified for the new software component, and it can be used to arrange a data transfer connection for the component via the broker component to other software components.

The configured adapter 203 (and the software component 201 specified by it) becomes part of the data system 200 when the adapter 203 is connected to the broker component 202, particularly to the list 507 maintained by it over connected adapters. In this case, run-time settings, such as its host, can also be associated with the adapter 203. Via the console component 208, the user is able to activate the software component 201 on the basis of an identifier 1111 associated therewith, for example, whereby a command 605 is forwarded to the daemon component 207 for also connecting the adapter 203. The daemon component 207 activates the software component 201 and the adapter 203. A request can then be transmitted from the adapter 203 to the broker component 202 for connecting the adapter identified by the identifier 1111, whereby the broker component 202 (broker 501) retrieves 606 the configuration of the adapter on the basis of the identifier 1111. The broker component 202 forwards the configuration associated with the identifier 1111 to the adapters 203 and adds the adapter 203 to the list 507 it maintains over connected adapters, i.e. connects 607 the adapter 203 to the broker component 202.

Data transfer can then be arranged via the connected adapter 203 to/from the software component 201. When data need to be transferred via the connected adapter 203 in response to a command 608 received from the software component 201 connected thereto or from the broker component 202, the adapter 203 is activated 609. The adapter 203 is typically activated when the user selects data transfer in a user interface provided by the software component 201 to another software component. In the activation 609 of the adapter 203, the required resources are set, e.g. the P2P interface 405 to receive/transmit data. Data can then be transferred 610 between the adapter 203 and another adapter 203 via the broker component 202.

A user of the system 202 is able to trace the operating adapters 203, 205 via the console component 208 and the framework interface 407 of the adapter 203. In this case, a notification is given of the available adapters (and/or particularly the software components 201 connected thereto) on the basis of the list 507 maintained by the broker component 202 over the adapters connected to the system.

Figure 6:
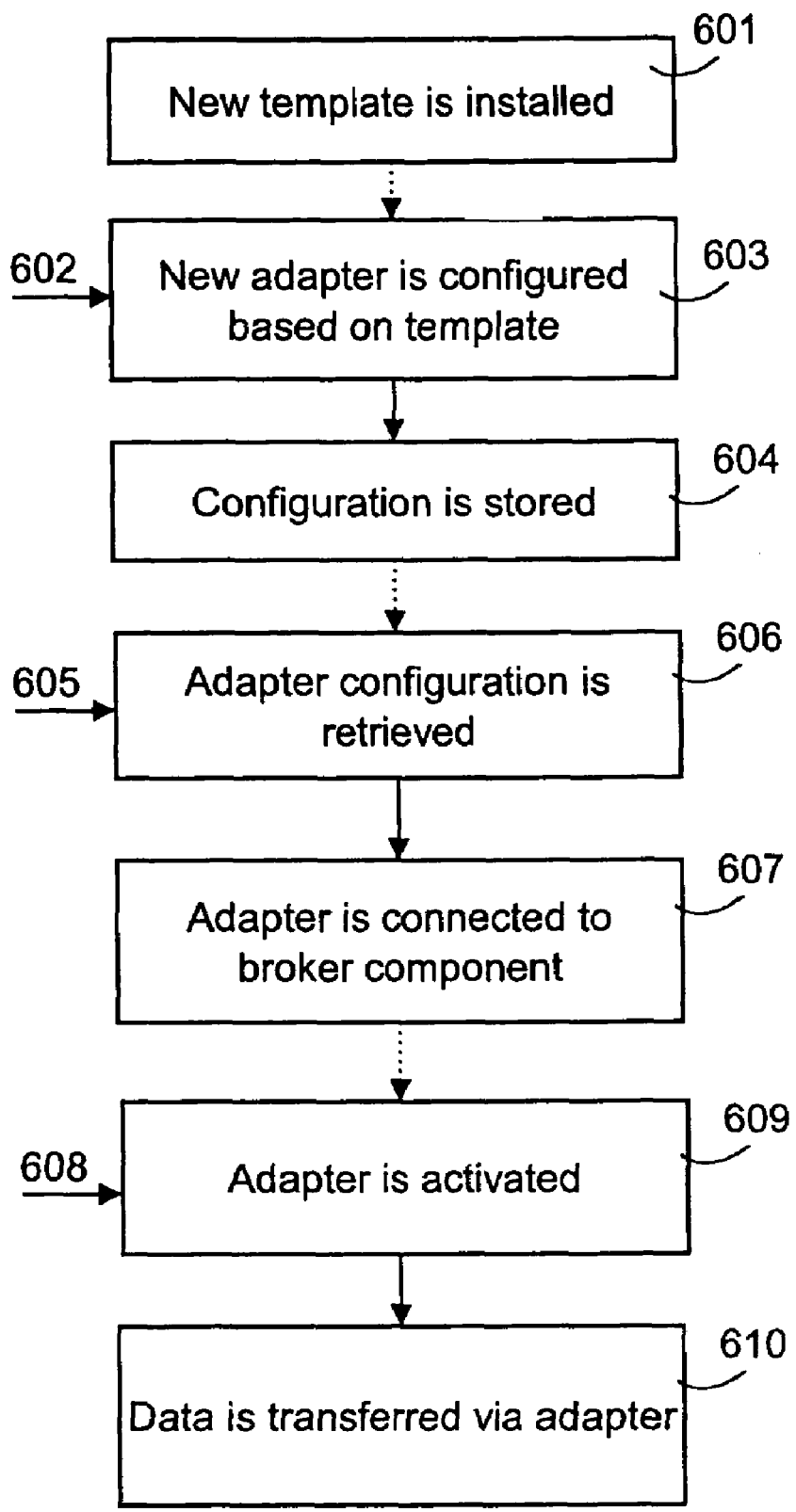
FIG. 6 illustrates a method according to a preferred embodiment of the invention.

In the following, different ways to arrange data transfer via the adapters 203 and the broker component 202, i.e. steps 609 and 610 of FIG. 6, are described in detail. As was stated before, data transfer between the adapters 203, 205 may be connection-oriented or event-based, i.e. connectionless.

In event-based data transfer, the adapter 203, 205 obtains the service interface instance 403, 406 via the framework interface 407. The transmitting adapter also obtains the service interface instance 403, 406 if it does not yet exist. Both adapters 203, 205 add a listener for future events to the service interface 403, 406. The adapter 203 packs the content to be transmitted, received from the software component 201, as an event having a transmission identifier and the identifier of the receiving adapter 203, 205. The event is transmitted to the broker component 202, which searches the list 507 it maintains for the receiving adapter 203 to find out if the receiving adapter is active and able to process an event of this kind. If so, the broker component 202 transmits the event to the addressed receiving adapter 203. The addressed receiving adapter 203 receives the event via the listener and forwards the content of the event to the software component 201. In the case of a synchronous event, the receiving adapter 203 transmits a response event to the transmitting adapter 203.

For P2P data transfer, the initiating adapter 203 transmits, via the interface 407, a request for opening a connection. A P2P interface 405 is arranged for the connection and it represents the connection to the second end point of the connection, i.e. the called adapter 203. The broker component 202 forwards a request to the second adapter 203 for opening a P2P connection, which receives it via a listening interface. The interfaces 405 of both adapters 203 are set to transmit and/or receive a data stream. In accordance with a preferred embodiment, the data streams may be usual java.io streams; any data stream per se can be conveyed via the P2P connection provided by the broker component 202.

In accordance with an embodiment, a detection function is implemented in the data system 200, preferably in the daemon component 207, the function automatically detecting a new software component 201, e.g. a terminal emulator installed in the data processing device 301. Having detected a new software component, this detection function may perform the functions illustrated in FIG. 6, and connect the software component to the data system 200, i.e. arrange an adapter 203 for it for connecting to the broker component 202.

In accordance with still another embodiment, a visual view of the topology of the data system 200, particularly of the software components 201, is provided to the user in the data system 200 via the console component 208. Herein, the user obtains an illustrative total view of the data system 200 by using graphic icons. The user may be offered the chance to specify new components and interfaces between existing components by drawing. For example, if the user draws a line between two software components 201, their adapters 203 can be automatically activated, and a data transfer connection may be arranged between them. When the user adds a new software component 201 to the data system 200 by adding its icon to the picture, all functions associated with the configuration and connection of the software component 201 and its adapter 203 can be performed, i.e. steps 601 to 607 in FIG. 6 can be executed. This embodiment further improves the usability of the software development environment, since the addition and modification of new component is easy for the user.

Accordingly, in a data system 200 according to a preferred embodiment, very different software components 201 can be interconnected via the adapters 203 and the broker component 202. In the following, examples are presented of arranging data transfer in different topologies and of how the data system 200 illustrated above can be utilized in different software development situations.

In a first example, data transfer is arranged for providing the testing of the software development of a server in the SMS/MMS environment (Short Message Service). Herein, the application developer developing the MMS application for the server can easily test the functioning of an application via different terminal emulators. A short message is transmitted from the terminal emulator via the adapter 203 to the broker component 202. The broker component 202 detects that the SMS server emulation environment is connected to the broker component 202 via an adapter 203 connected to the SMS server emulator, and routes the message to it. The broker component 202 forwards the short message to the SMS server emulator (SMSC emulator; Short Message Service Centre), i.e. to a function emulating the network short message service. The SMS server emulator forwards the short message to an external MMS application to be tested, e.g. using the CIMD protocol (Computer Interface to Message Distribution). The MMS application receives an indication of the short message. In this example, the application logics create an MMS message and transmit it back to the terminal emulator transmitting the short message. The MMS application transmits the MMS message to the MMS server emulator, i.e. the software component emulating the MMS function, by using e.g. the EAIF protocol (External Application Interface). The MMS server emulator forwards the message via the adapter 203 connected thereto to the broker component 202. The broker component 202 forwards the message on the basis of addressing data maintained by it to the correct terminal emulator via the adapter 203 connected thereto. The adapter 203 (which may be the same as or a different adapter than in the transmission of the short message) forwards the MMS message to the terminal emulator 201, wherein the MMS message can be viewed and checked if it conforms to what was intended. In this embodiment, the software developer can test the operation of the application developed and look for errors therein on the one hand and, on the other hand, test the correctness of the message created by the application in different terminals in the same software development environment.

In a second example, the content developer can easily forward a content to different terminal emulators and/or an actual terminal and find out how the content is presented in different terminals. The content, e.g. an MMS message, of the content development software component (201) of the content provider is forwarded using only one interface, i.e. via the adapter 203 connected to the content development software component to different terminal emulators via the broker component 202 and the adapters 203 connected to the terminal emulators. The content may also be forwarded to an actual wireless terminal e.g. via an adapter 203 providing an interface to the Bluetooth environment (Bluetooth application). This kind of an adapter adapts the MMS message into a form transmittable via a Bluetooth connection, after which the Bluetooth application of the data processing device that developed the content is able to transfer the message to an actual terminal. This enables the simultaneous testing of several software components, which may be in both actual terminals and in terminal emulators. An adapter 203 can also be connected to the broker component 202, and via the adapter an interface to a network of a teleoperator is arranged, e.g. to the MMS relay functionality of the 3GPP system (Third Generation Partnership Project), via which the content can be relayed to an actual terminal TE or to the mobile network MNW.

In a third example, the application developer can test and/or simulate a Bluetooth application in one data processing device by using a terminal emulator, the adapters 203, the broker component 202 and a Bluetooth environment simulator. The Bluetooth application is developed in the software development component (201). The software of the application being developed can be transferred via the adapter 203 of the application development component, the broker component 202 and the adapter 203 of the terminal emulator to the terminal emulator. The received application can be executed in the terminal emulator and tested with the simulator of the Bluetooth environment and/or an actual Bluetooth environment by using the adapters 203 arranged for them.

In a fourth example, an end-to-end short messaging application is developed in a software development environment, via whose adapter 203 and broker component 202 the application is transferred to a terminal emulator and a short message centre emulator (or a server emulator). Messages can then be relayed between the terminal emulator (client) and the short message centre emulator or server emulator in accordance with the application logics transferred, allowing the functioning of the application logics to be tested even using one data processing device.

As can be seen on the basis of the above examples, the solution of the invention enables testing of end-to-end applications irrespective of available technologies. For example, an application executed in a Java emulator (201) transmits, via a Java interface (java API), a short message SMS that is transferred via the adapters (203) and the broker component (202) to a service (201) in the system. This service listens to SMS messages and, having received an SMS message, creates an MMS message, which is transmitted via the adapter 203 connected to the service and the broker component 202 to the MMS software components (e.g. emulators, MMSC, MMSC simulator) in the environment. In other words, the solution of the present invention allows applications to be 'chained' for easy testing of their operation. The application may naturally be implemented using any other programming language, such as the C, C++ or Pascal languages. Instead of a short message, IP-form messages, MMS messages or messages according to the HTTP protocol can be transmitted, i.e. the transfer protocol may be any existing one or one developed in the future. Available transfer channels include short-range radio connections, cellular connections, such as GPRS or UM.TS connections or optical connections, such as infrared.

It is obvious to a person skilled in the art that as technology advances, the basic idea of the invention can be implemented in a variety of ways. The invention and its embodiments are thus not limited to the above examples, but may vary within the claims.

Appendix 1: DTD Definition

```
<?xml version="1.0" encoding="ISO-8859-1"?>
<!ELEMENT Property EMPTY>
<!ATTLIST Property
    Id ID #IMPLIED
    Name CDATA #REQUIRED
    Value CDATA #REQUIRED
>
<!ELEMENT ClassName (#PCDATA)>
<!ELEMENT Description (#PCDATA)>
<!ELEMENT FrameworkConfiguration (AdapterConfiguration |
AdapterUI-Configuration)>
<!ELEMENT AdapterConfiguration (ClassName?, AdapterHosting,
AdapterIdentification, InstanceSettings?, ServiceSupports,
ProductManagement?, Property*)>
<!ELEMENT AdapterHosting EMPTY>
<!ATTLIST AdapterHosting
    HostAddress CDATA #IMPLIED
    Autostart (TRUE | FALSE) #REQUIRED
>
<!ELEMENT InstanceSettings EMPTY>
<!ATTLIST InstanceSettings
    MaxCount CDATA #REQUIRED
    ActionWhenViolated (NONE | KILL) #REQUIRED
>
<!ELEMENT ServiceSupports (ServiceSupport+)>
<!ELEMENT ServiceSupport (ServiceType, ServiceVersion, ContentHandlers?, Senders?, Receivers?)>
<!ATTLIST ServiceSupport
    ServiceID ID #REQUIRED
    CanReceive (TRUE | FALSE) #REQUIRED
    Filtering (TRUE | FALSE) #REQUIRED
>
<!ELEMENT ServiceType (#PCDATA)>
<!ELEMENT ServiceVersion (#PCDATA)>
<!ELEMENT ContentHandlers (ContentHandler+)>
<!ELEMENT ContentHandler (ClassName, Property*)>
<!ELEMENT Senders (Sender*)>
<!ELEMENT Sender (ClassName, Property*)>
<!ELEMENT Receivers (Receiver*)>
<!ELEMENT Receiver (ClassName, Property*)>
<!ELEMENT AdapterIdentification (AdapterGroup, AdapterType,
AdapterDescription, AliasIDs?)>
<!ATTLIST AdapterIdentification
    AdapterID CDATA #REQUIRED
    InitialCreationMethod (USER | SYSTEM) #REQUIRED
>
<!ELEMENT AliasIDs (AliasIDRange*, AliasID*)>
<!ELEMENT AliasIDRange EMPTY>
<!ATTLIST AliasIDRange
    Min CDATA #REQUIRED
    Max CDATA #REQUIRED
>
<!ELEMENT AliasID EMPTY>
<!ATTLIST AliasID
    Value CDATA #REQUIRED
>
<!ELEMENT AdapterGroup (#PCDATA)>
<!ELEMENT AdapterType (#PCDATA)>
<!ELEMENT AdapterDescription (#PCDATA)>
<!ELEMENT ProductManagement (ProductStarter?, ProductStopper?,
ProductDetector?, ProductConfigurator?)>
<!ELEMENT ProductStarter (ClassName, Property*)>
<!ELEMENT ProductStopper (ClassName, Property*)>
<!ELEMENT ProductDetector (ClassName, Property*)>
<!ELEMENT ProductConfigurator (ClassName, Property*)>
<!ELEMENT DefaultAdapterID (#PCDATA)>
<!ELEMENT Framework (ClassName, Identification, Property*)>
<!ELEMENT Identification (Description)>
<!ELEMENT AdapterUIConfiguration (Component+)>
<!ELEMENT Component EMPTY>
<!ATTLIST Component
    Id ID #REQUIRED
    Label CDATA #REQUIRED
    LabelKey CDATA #IMPLIED
>
```

The invention claimed is:

1. A method of arranging data transfer in a data system between software components implementing mobile communication applications in a software development environment, the data system comprising at least a first software component and a second software component, at least one of the software components comprising program code for controlling a mobile station, the data system further comprising adapters for the different software components and a broker component for transferring data between different adapters, wherein an adapter provides an interface to the broker component for at least one software component connected to the adapter, and wherein addressing information is maintained in the broker component about the adapters in the data system, in which method a first adapter in the data system is activated for a first software component and a second adapter for a second software component in response to a need for data transfer between the first software component and the second software component, and data is transferred in the broker component between the first adapter and the second adapter in accordance with the addressing information.

2. A method as claimed in claim 1, wherein interfaces for the first adapter and the second adapter to the broker component are arranged for connection-oriented or connectionless data transfer in response to the need for data transfer between the first software component and the second software component.

3. A method as claimed in claim 1, the method further comprising:

maintaining identifiers of the first adapter and the second adapter and information about the properties of the adapters in the broker component in response to the first adapter and the second adapter being connected to the broker component, and checking, in the broker component, on the basis of the identifiers and properties of the adapters, if data transfer is possible between the first adapter and the second adapter in response to the need for data transfer between the first software component and the second software component.

4. A method as claimed in claim 1, wherein the data system has at least one stored template comprising information about the properties of the first software component for specifying an adapter for the first software component, whereby the configuration of the first adapter is specified on the basis of the template, the configuration of the first adapter is stored in the data system, and the configuration of the first adapter is retrieved when the first adapter is connected to the broker component.

5. A method as claimed in claim 1, wherein an adaptation functionality provided by the adapter is arranged by using a software adaptation, the adapter being implemented in a software component process, or an adaptation functionality provided by the adapter is arranged by using a communication adaptation, the adapter being implemented in a separate process and the data transfer being arranged between the adapter and the software component process by using a data transfer protocol.

6. A method as claimed in claim 1, wherein the system further comprises at least one filter adapter connected to the broker component, whereby the data transfer between the first software component and the second software component is arranged via the filter adapter, and information is collected in the filter adapter about information transferred between the first software component and the second software component.

7. A method as claimed in claim 1, wherein the first adapter provides an interface to a data transfer application of the mobile communication system, the application being the first software component.

8. A data system comprising at least a first software component and a second software component, at least one of the software components comprising program code for controlling a mobile station, wherein the data system further comprises adapters for the different software components and a broker component for transferring data between different adapters, an adapter being configured to provide an interface to the broker component for at least one software component connected thereto, and the broker component being configured to maintain addressing information about the adapters in the data system, wherein a first adapter is configured to be activated for a first software component and a second adapter is configured to be activated for a second software component in the data system in response to a need for data transfer between the first software component and the second software component, and the broker component is configured to transfer data between the first adapter and the second adapter in accordance with the addressing information.

9. A computer-readable storage medium containing a computer program product for controlling one or more data processing devices for arranging data transfer between a first software component and a second software component, at least one of the software components comprising program code for controlling a mobile station, wherein the computer program product comprises a program code portion for implementing adapters for the different software components, wherein an adapter provides an interface to a broker component for at least one software component connected thereto, a program code portion for implementing the broker component for data transfer between the different adapters, the broker component being configured to maintain addressing information about the adapters in a data system, a program code portion for controlling the data processing device to activate a first adapter for a first software component and a second adapter for a second software component in response to a need for data transfer between the first software component and the second software component, and a program code portion for controlling the data processing device to set the broker component to transfer data between the first adapter and the second adapter in accordance with the addressing information.

10. A data processing device, comprising at least a first software component and a second software component, at least one of the software components comprising program code for controlling a mobile station, wherein the data processing device further comprises adapters for the different software components and a broker component for transferring data between different adapters, an adapter being configured to provide an interface to the broker component for at least one software component connected thereto, and the broker component being configured to maintain addressing information about the adapters in the data processing device, wherein
   a first adapter is configured to be activated for a first software component and a second adapter is configured to be activated for a second software component in the data system in response to a need for data transfer between the first software component and the second software component, and the broker component is configured to transfer data between the first adapter and the second adapter in accordance with the addressing information.

\* \* \* \* \*

UNITED STATES PATENT AND TRADEMARK OFFICE
CERTIFICATE OF CORRECTION

PATENT NO. : 7,317,912 B2
APPLICATION NO. : 10/779127
DATED : January 8, 2008
INVENTOR(S) : Pakarinen et al.

It is certified that error appears in the above-identified patent and that said Letters Patent is hereby corrected as shown below:

In the Specification

Col. 1, line 23-24: "mult-media" should read --multi-media--.

Col. 1, line 57: "developent" should read --development--.

Col. 5, line 2: "based, i.e." should read --based data, i.e.--.

Col. 5, line 16: "reestablishments." should read --re-establishments.--.

Signed and Sealed this

Tenth Day of June, 2008

JON W. DUDAS
*Director of the United States Patent and Trademark Office*